United States Patent
Weil et al.

(10) Patent No.: US 8,539,985 B2
(45) Date of Patent: Sep. 24, 2013

(54) COMPACT HIGH PRESSURE RUBBER HOSE

(75) Inventors: Andreas Weil, Mentor, OH (US); John Huckaby, Chardon, OH (US); Mathew Johns, Willoughby Hills, OH (US); Kyu Tae Lee, Busan (KR); Perluigi Pelanda, Bresso (IT)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 13/146,548

(22) PCT Filed: Feb. 2, 2010

(86) PCT No.: PCT/US2010/022794
§ 371 (c)(1),
(2), (4) Date: Aug. 16, 2011

(87) PCT Pub. No.: WO2010/110941
PCT Pub. Date: Sep. 30, 2010

(65) Prior Publication Data
US 2011/0290362 A1    Dec. 1, 2011

Related U.S. Application Data

(60) Provisional application No. 61/164,002, filed on Mar. 27, 2009.

(51) Int. Cl.
*F16L 11/00* (2006.01)

(52) U.S. Cl.
USPC ............ 138/126; 138/125; 138/137; 138/141

(58) Field of Classification Search
USPC ........ 138/129, 130, 144, 172, 140; 428/36.2, 428/36.91, 36.8
See application file for complete search history.

(56) References Cited

U.S. PATENT DOCUMENTS

| | | | |
|---|---|---|---|
| 3,116,760 A | 1/1964 | Matthews | |
| 3,159,183 A | 12/1964 | Brumbach | |
| 3,212,528 A * | 10/1965 | Haas | 138/130 |
| 3,921,674 A | 11/1975 | Logan et al. | |
| 3,953,270 A | 4/1976 | Ford | |
| 3,966,238 A | 6/1976 | Washkewicz et al. | |
| 3,994,761 A | 11/1976 | Higbee | |
| 4,104,098 A | 8/1978 | Hush et al. | |
| 4,238,260 A | 12/1980 | Washkewicz | |
| 4,564,223 A | 1/1986 | Burrington | |
| 4,585,035 A | 4/1986 | Piccoli | |
| 4,759,388 A | 7/1988 | Kiyama et al. | |
| 4,905,734 A * | 3/1990 | Ito | 138/126 |
| 4,905,735 A * | 3/1990 | Akiyoshi | 138/126 |
| 4,952,262 A | 8/1990 | Washkewicz et al. | |
| 4,998,564 A * | 3/1991 | Igarashi et al. | 138/126 |

(Continued)

OTHER PUBLICATIONS

Notification of Transmittal of the International Search Report and the Written Opinion of the International Searching Authority, or the Declaration dated Apr. 15, 2010 in corresponding International Application No. PCT/US2010/022794.

(Continued)

*Primary Examiner* — Patrick F Brinson
(74) *Attorney, Agent, or Firm* — John A. Molnar, Jr.

(57) ABSTRACT

Compact flexible reinforce rubber hose adapted for conveying fluids under high pressure. The hose includes a thin inner tube formed of a vulcanized rubber.

12 Claims, 2 Drawing Sheets

(56) References Cited

U.S. PATENT DOCUMENTS

| | | | |
|---|---|---|---|
| 5,957,164 A * | 9/1999 | Campbell | 138/137 |
| 6,037,025 A | 3/2000 | Matsunaga et al. | |
| 6,474,366 B2 | 11/2002 | Bruno | |
| 7,143,789 B2 | 12/2006 | Nagy et al. | |
| 2002/0100516 A1 | 8/2002 | Powell et al. | |
| 2003/0188793 A1 * | 10/2003 | Kanbe et al. | 138/126 |
| 2006/0011250 A1 * | 1/2006 | Ikemoto et al. | 138/126 |

OTHER PUBLICATIONS

Notification of Transmittal of the International Preliminary Report on Patentability dated Jun. 24, 2011, in corresponding International Application No. PCT/US2010/022794.

* cited by examiner

COMPACT HIGH PRESSURE RUBBER HOSE

CROSS REFERENCE TO RELATES CASES

The present application claims the benefit of the filing date of U.S. Provisional Application Ser. No. 60/164,002; filed Mar. 27, 2009, the disclosure of which is expressly incorporated herein by reference.

BACKGROUND OF THE INVENTION

The present invention relates broadly to flexible rubber hoses for low, medium, or, particularly, high pressure applications, and more particularly to a construction therefor which is of a compact design.

Flexible rubber hose is used in a variety of hydraulic and other fluid transfer applications for conveying fluid pressures which for "high" pressure applications typically range from about 4000 psi (28 MPa) to 8000 psi (55 MPa) or more. In basic construction, hoses of the type herein involved typically are formed as having a tubular, innermost inner tube or core surrounded by one or more outer layers of a braided or spiral-wound reinforcement material which may be a metal or metal-alloy wire or a natural or synthetic fiber. The reinforcement layers, in turn, are protected by a surrounding outermost jacket or cover which may be of the same or different material as the inner tube. The cover also provides the hose with increased abrasion resistance.

In the case of "rubber," as opposed to thermoplastic, hose constructions, the inner tube, may be provided as formed of a vulcanizable natural or, more typically, a synthetic rubber material such as Buna-N or neoprene. Such material or blend may be conventionally extruded and cooled or cured to form the inner tube. As is detailed in U.S. Pat. Nos. 3,116,760; 3,159,183; 3,966,238; and 4,952,262, if necessary, the tube may be cross-head extruded over a mandrel for support, or otherwise supported in later forming operations using air pressure and/or reduced processing temperatures.

From the extruder, the inner tube may be delivered through a braider and/or a spiral winder for its reinforcement with one or more surrounding layers of a wire and/or fibrous material or blend such as a monofilament, yarn, cord, yarn-wire composite, or roving. As is described in Japanese (Kokai) Publ. No. 10-169854 A2, Canadian Patent No. 973,074, and U.S. Pat. Nos. 3,654,967; 3,682,201; 3,790,419; 3,861,973; 3,905, 398; 4,007,070; 4,064,913; 4,343,333; and 4,898,212, these reinforcement layers are applied under tension and typically may be formed of an interwoven braid or a spiral winding of a nylon, polyester, polyphenylene bezobisoxazole, polyvinyl acetate, or aramid yarn, or a high tensile steel or other metal wire. A relatively thin bonding or other interlayer of a vulcanizable rubber may be extruded or otherwise applied between each of the reinforcement layers to bond each layer to the next layer.

Following the braiding, winding, or other application of the reinforcement layers and the interlayers, an outer cover or sheath optionally may be applied. Such cover, which may be formed as a cross-head extrusion, a moisture-cured or solvent-based dipped coating, or a spiral-wound wrapping, typically comprises an abrasion-resistant synthetic rubber or a thermoplastic such as a polyurethane. Following the application of the cover, the hose construction so-formed by be heated to vulcanize the rubber layers and thereby consolidate the construction into an integral hose structure. Representative hose constructions, as well as manufacturing methods and materials therefor, are shown in U.S. Pat. Nos. 3,921,674; 3,953,270; 3,994,761; 4,104,098; 4,238,260; 4,759,388; 6,037,025; 6,474,366 and 7,143,789.

In normal use, such as in mobile or industrial hydraulic applications, hoses of the type herein involved may be exposed to a variety of environmental factors and mechanical stresses which cannot always be predicted. Of utmost importance to the integrity and performance of the hose is that a strong bond is achieved between the constituent parts thereof. However, while it is important to bond these parts together, it is also important that the hose not be made overly stiff so as to make it prone to kinking or fatigue or otherwise useable for certain applications.

In view of the foregoing, it will be appreciated that hose constructions must exhibit a demanding balance of chemical and physical properties. Indeed, as commercial applications for hoses continue to increase, it is believed that improvements in hose constructions would be well-received by numerous industries. Especially desired would be a construction which is flexible and light-weight, yet resistant to external stresses in a variety of mobile and industrial applications.

BROAD STATEMENT OF THE INVENTION

The present invention is directed to flexible rubber hoses, and particularly to a construction therefor which results in a hose which is of most compact design, but which is still flexible. Such construction may be adapted for use in a variety applications such as mobile or industrial hydraulic installations specifying relatively high working pressures of between about 4000-8000 psi (28-55 MPa).

The hose of the present invention employs a thin-walled rubber inner having a thickness which may approach that of thermoplastic cores, but which affords improved flexibility in the hose. Such thin-walled tube construction, moreover, results in a reduced overall wall thickness and outer diameter as compared to comparably-sized and rated conventional rubber hose designs which, in turn, allows for tighter bend radii and for a reduction in weight and required bending forces. The compactness of the design further allows for the hose to be used in tighter spaces than conventional rubber hoses.

In an illustrated embodiment, the hose construction of the present invention includes a thin-walled rubber inner tube over which, for example, at least a pair of metal or metal alloy wire reinforcement layers are spiral wound to provide resistance to internal working pressures of 4000 psi (28 MPa) or more. A protective cover may be provided over the reinforcement layers. Each reinforcement layer may be bonded to the next adjacent reinforcement layer by a rubber or other interlayer interposed therebetween, with the inner tube being bonded to the innermost reinforcement layer, and the cover being bonded to the outermost reinforcement layer. That is, the rubber layers of the hose as so formed may be vulcanized to bond each layer in the hose wall to the next adjacent layer to thereby consolidate the layers into an integral hose wall structure.

The present invention, accordingly, comprises the construction, combination of elements, and/or arrangement of parts and steps which are exemplified in the detailed disclosure to follow. Advantages of the present invention include a compact and light-weight hose design which has a low profile which in service increases the space available for installation and maintenance. Additional advantage include a hose which is more flexible and has a tighter bend radius than comparable hoses for easier routing, and which may be designed to meet or exceed existing standards for high pressure hydraulic hoses such as Society of Automotive Engineers (SAE) J517 and J1754, International Organization for Standardization (ISO)

3862 and J1745, German Institute for Standardization (DIN) EN 856, and others. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
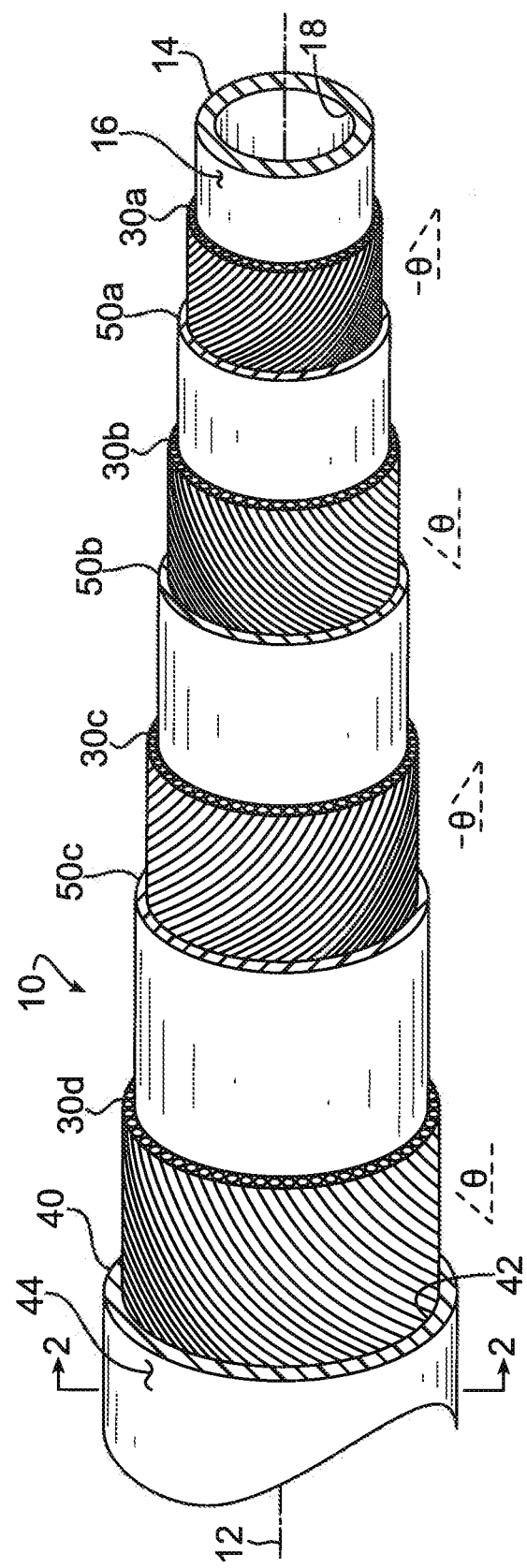
FIG. 1 is a side elevation, cut-away view of a representative compact rubber hose construction according to the present invention.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

For illustration purposes, the precepts of the compact rubber hose construction herein involved are described in connection with its configuration as particularly adapted for use in high pressure, i.e., between about 4000-8000 psi (28-55 MPa) mobile or industrial hydraulic applications. It will be appreciated, however, that aspects of the present invention may find use in other hose constructions for a variety or general hydraulic or other fluid transfer applications. Use within those such other applications therefore should be considered to be expressly within the scope of the present invention.

Figure 2:
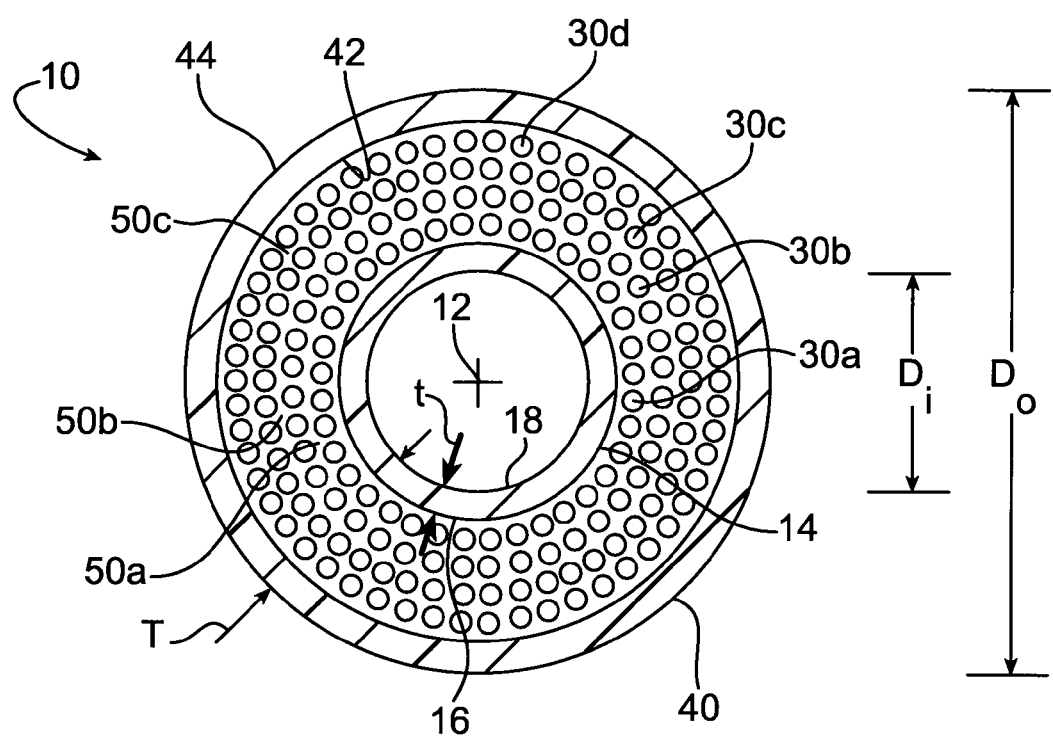
FIG. 2 is a radial cross-sectional view of the hose of FIG. 1 taken through line 2-2 of FIG. 1.

Referring then to the figures wherein corresponding reference characters are used to designate corresponding elements throughout the several views with equivalent elements being referenced with prime or sequential alphanumeric designations, a representative hose construction according to the present invention is shown generally at 10 in the cut-away view of FIG. 1 and in the radial cross-sectional view of FIG. 2. In basic dimensions, hose 10 extends axially to an indefinite length along a central longitudinal axis, 12, and has a select inner and outer diameter referenced, respectively, at "$D_i$" and "$D_o$" in the radial cross-sectional view of FIG. 2. The inner and outer diameter dimensions may vary depending upon the particular fluid conveying application involved, but generally for many high pressure hydraulic applications will be between about 0.25-2 inch (6-51 mm) for inner diameter $D_i$, and about 0.5-3 inch (13-76 mm) for outer diameter $D_o$, with an overall wall thickness, "T," therebetween of between about 0.12-0.5 inch (3-13 mm).

As may be seen in the different views of FIGS. 1 and 2, hose 10 is constructed as being formed about a tubular innermost layer, i.e., inner tube or core, 14, which may be of a single or multi-layer construction. In either construction, inner tube 14 has a circumferential outer core tube surface, 16, and a circumferential inner core tube surface, 18, which defines the inner diameter $D_i$ of the hose 10. A wall thickness is defined between the outer and inner core tube surfaces 16 and 18, as referenced at "t" in the cross-sectional view of FIG. 2. Such thickness t, which may be between about 0.02-0.05 inch (0.5-1.25 mm), may be the minimum necessary to provide the desired pressure rating and solvent, gas, and/or liquid permeation resistance. With the overall wall thickness T of hose 10 being, as mentioned, between about 0.12-0.5 inch (3-13 mm) for many sizes of hose 10, the tube wall thickness t thus may comprises less than about 25% of that thickness T, with the balance being comprised of the reinforcement and bonding layers, and any cover, that are necessary for the hose to meet a size, desired pressure rating, and/or applicable industrial standard.

Inner tube 14 may be provided as extruded or otherwise formed of a vulcanizable, chemically-resistant, synthetic rubber. As used herein, "chemical resistance" should be understood to mean the ability to resist swelling, crazing, stress cracking, corrosion, or otherwise to withstand attack from organic solvents and hydrocarbons, such as hydraulic fluids. Suitable materials include acrylonitrile butadiene rubbers (NBR) and modified NBR's such as hydrogenated NBR (HNBR) and cross-linked NBR (XNBR), as well as copolymers and blends, thereof. Such blends may be, for example, XNBR or HNBR blended with one or more of a chlorinated polyethylene (CPE), polyvinyl chloride (PVC), or polychloroprene (CR).

In its raw, i.e., uncompounded, form, the NBR may have a mid to high acrylonitrile (ACN) content of between about 19-36%, and a Mooney viscosity ((ML 1+4)@212° F. (100° C.)) of at least about 90. Such viscosity allows the rubber material to be compounded with between about 15-66% by total weight of the compound of one or more reinforcing fillers. Each of such fillers may be provided, independently, as a powder or as flakes, fibers, or other particulate form, or as a mixture of such forms. Typical of such reinforcing fillers include carbon blacks, clays, and pulp fibers. For powders, the mean average particle size of the filler, which may be a diameter, imputed diameter, screen, mesh, length, or other dimension of the particulate, may range between about 10-500 nm.

Additional fillers and additives may be included in the formulation of the rubber compound depending upon the requirements of the particular application envisioned. Such fillers and additives, which may be functional or inert, may include curing agents or systems, wetting agents or surfactants, plasticizers, processing oils, pigments, dispersants, dyes, and other colorants, opacifying agents, foaming or anti-foaming agents, anti-static agents, coupling agents such as titanates, chain extending oils, tackifiers, flow modifiers, pigments, lubricants, silanes, and other agents, stabilizers, emulsifiers, antioxidants, thickeners, and/or flame retardants. The formulation of the material may be compounded in a conventional mixing apparatus as an admixture of the rubber and filler components, and any additional fillers or additives. As vulcanized and filled with between about 15-66% of a carbon black filler, the compound may have the physical properties listed in the table below.

TABLE

| Durometer (Shore A), pts | 83 +/− 5 |
|---|---|
| Elongation @ Break (%) | 180 +/− 50 |
| Modulus @ 100% Strain (MPa) | 12 +/− 2 |
| Tensile Strength @ break (MPa) | 18 +/− 3 |

With respect to the spiral-wound construction shown in FIGS. 1 and 2, at least two, and typically four (as shown) or up to six or more, reinforcement layers, 30*a-d*, are provided over the inner tube 14. Each of the reinforcement layers 30 may be conventionally formed as braided, knitted, wrapped, or, as is shown, spiral, i.e., helically, wound of, for example, from 1 to about 180 ends of monofilament, continuous multi-filament, i.e., yarn, stranded, cord, roving, thread, tape, or ply, or short "staple" strands of a fiber material. The fiber material, which may be the same or different in layers 30*a-d*, may be a natural or synthetic polymeric material such as a nylon, cotton, polyester, polyamide, aramid, polyolefin, polyvinyl alcohol (PVA), polyvinyl acetate, or polyphenylene bezobisoxazole (PBO), or blend, a steel, which may be stainless or galvanized, brass, zinc or zinc-plated, or other metal wire, or a blend thereof.

In the illustrated spiral wound construction 10 of FIGS. 1 and 2, which also may contain additional extruded, spiral, braided, and/or knitted layers (not shown), the reinforcement layers 30 are oppositely wound in pairs so as to counterbalance torsional twisting effects. For each of the spiral wound layers 30*a-d*, from 1 to about 180 parallel ends of, preferably, a monofilament metal or metal alloy wire, may be helically wound under tension in one direction, i.e., either left or right hand, with the next immediately succeeding layer 30 being wound in the opposite direction. The innermost reinforcement layer 30*a* may be wound as is shown in FIG. 1 directly over the outer surface 16 of inner tube 14, or over an intermediate textile, foil, or film or other layer.

As successively wound in the hose 10, the layers 30*a-d* each may have a predetermined pitched angle, referenced at −θ in FIG. 1 for layers 30*a* and 30*c*, and at for layers 30*b* and 30*d*, measured relative to the longitudinal axis 12 of the hose 10. For typical applications, the pitch angle θ will be selected to be between about 45-63°, but particularly may be selected depending upon the desired convergence of strength, elongation, weight, and volumetric expansion characteristics of hose 10. In general, higher pitch angles above about 54.7° exhibit decreased radial expansion of the hose under pressure, but increased axial elongation. For high pressure applications, a "neutral" pitch angle of about 54.7° generally is preferred as minimizing elongation to about ±3% of the original hose length. Each of the layers 30 may be wound at the same or different absolute pitch angle, and it is known that the pitch angles of respective reinforcement layers may be varied to affect the physical properties of the hose. In a preferred construction, however, the pitch angles of reinforcement layers 30*a-d* are provided to about the same, but as reversed in successive layers.

The tension and area coverage at which the reinforcement layers 30 are braided, wound, or knitted may be varied to achieve the desired flexibility, which may be measured by bend radius, flexural forces, or the like, of the hose 10. For the spiral wound layers 30*a-d* depicted in FIGS. 1 and 2, the constituent wires or other ends generally will be applied at greater than about 70% coverage.

In the illustrated construction which may be particularly adapted for high pressure hydraulic applications, each of the reinforcement layers 30*a-d* may be spiral wound from one end of a monofilament carbon or stainless steel wire having a generally circular cross-section with a diameter of between about 0.008-0.04 inch (0.2-1 mm). As so formed, each of the layers 30*a-d* thus may have a thickness of that of the wire diameter. Although a circular wire is shown, a "flat-wire" construction alternatively may be employed using wires having a rectangular, square, or other polygonal cross-section. Low profile oval or elliptical wires also may be used. To better control the elongation and contraction of hose 10, and for improved impulse fatigue life, the innermost reinforcement layer 30*a* may be bonded, by means of fusion, i.e., vulcanization of the inner tube 14, mechanical, chemical, or adhesive bonding, or a combination thereof or otherwise, to the outer surface 16 of the core tube 14.

The outermost reinforcement layer 30*d* may be sheathed within one or more layers of a coaxially-surrounding protective cover or jacket, referenced at 40, having a circumferential interior surface, 42, and an opposing circumferential exterior surface, 44, which defines the hose outer diameter $D_o$. Depending upon its construction, cover 40 may be spray-applied, dip coated, cross-head or co-extruded, or otherwise conventionally extruded, spiral or longitudinally, i.e., "cigarette," wrapped, or braided over the reinforcement layer 30*d* as, for example, a 0.02-0.15 inch (0.5-3.8 mm) thick layer of an fiber, glass, ceramic, or metal-filled, or unfilled, abrasion-resistant thermoplastic, i.e., melt-processible, or thermosetting, vulcanizable natural rubber or a synthetic rubber such as fluoropolymer, chlorosulfonate, polybutadiene, butyl, neoprene, nitrile, polyisoprene, and buna-N, copolymer rubbers such as ethylene-propylene (EPR), ethylene-propylene-diene monomer (EPDM), nitrile-butadiene (NBR) and styrene-butadiene (SBR), or blends such as ethylene or propylene-EPDM, EPR, or NBR, and copolymers and blends of any of the foregoing. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides. As used herein, the term "elastomeric" is ascribed its conventional meaning of exhibiting rubber-like properties of compliancy, resiliency or compression deflection, low compression set, flexibility, and an ability to recover after deformation, i.e., stress relaxation.

By "abrasion-resistant," it is meant that such material for forming cover 40 may have a hardness of between about 60-98 Shore A durometer.

Any of the materials forming the cover 40 may be loaded with metal particles, carbon black, or another electrically-conductive particulate, flake, or fiber filler so as to render hose 10 electrically-conductive for static dissipation or other applications. Separate electrically-conductive fiber or resin layers (not shown), which may be in the form of spiral or "cigarette-wrapped" tapes or otherwise provided, also may be included in the hose construction 10 between the core 14 and the innermost reinforcement layer 30a, between the reinforcement layers 30, or between the outermost reinforcement layer 30d and cover 40.

Similar to the bonding of core 14 to the innermost reinforcement layer 30a, or to a textile or other layer therebetween, the interior surface 42 of cover 40 may be bonded to the outermost reinforcement layer 30d. Such bond, again, may be by fusion, chemical, mechanical, or adhesive means, or a combination thereof or other means.

Each of the reinforcement layers 30a-d within hose 10 may be bonded, such as chemically and/or mechanically, to its immediately succeeding layer 30 so as to provide for the more efficient transfer of induced internal or external stresses. Such bonding may be effected via the provision of a bonding agent in the form of an intermediate adhesive, resin, or other interlayer, 50a-c. In an illustrative embodiment, such bonding agent may be provided as an adhesive in the form of a melt-processable or vulcanizable material which is extruded or otherwise applied in a molten, softened, uncured or partially uncured, or otherwise flowable phase over each of the reinforcement layers 30a-d to form the respective interlayers 50a-c. Each such interlayer 50 may have a thickness of between about 1-25 mils (0.025-0.64 mm). The corresponding reinforcement layer 30 then may be wound over the corresponding interlayer 50 while it is still in its softened phase. Alternatively in the case of a thermoplastic interlayer 50, the layer may be reheated to effect its re-softening prior to the winding of reinforcement layer 30.

The material forming interlayers 50 specifically may be selected for high or low temperature performance, flexibility, or otherwise for compatibility with the reinforcement layers 30 and/or the inner tube 14 and cover 40. Suitable materials include natural and synthetic rubbers, as well as thermoplastic, i.e., melt-processible, or thermosetting, i.e., vulcanizable, resins which should be understood to also include, broadly, materials which may be classified as elastomers or hot-melts. Representative of such resins include plasticized or unplasticized polyamides such as nylon 6, 66, 11 and 12, polyesters, copolyesters, ethylene vinyl acetates, ethylene terpolymers, polybutylene or polyethylene terephthalates, polyvinyl chlorides, polyolefins, fluoropolymers, thermoplastic elastomers, engineering thermoplastic vulcanizates, thermoplastic hot-melts, copolymer rubbers, blends such as ethylene or propylene-EPDM, EPR, or NBR, polyurethanes, and silicones. In the case of thermoplastic resins, such resins typically will exhibit softening or melting points, i.e., Vicat temperatures, of between about 77-250° C. For amorphous or other thermoplastic resins not having a clearly defined melting peak, the term melting point also is used interchangeably with glass transition point.

With each of the respective layers 14, 30a, 50a, 30b, 50b, 30c, 50c, 30d, and 40 being extruded, wound, or otherwise formed sequentially in such order, following the application of the cover 40, the hose 10 may be heated to vulcanize the rubber layers and thereby consolidate the construction into an integral hose structure.

Thus, an illustrative rubber hose construction is described which is of most compact design, but which is still flexible. Such construction may be rated, such as under SAE J517 or J1754, ISO 3862 or J1745, and/or DIN EN 856, or otherwise adapted for use in a variety applications such as mobile or industrial hydraulic installations specifying relatively high working pressures of between about 4000-8000 psi (28-55 MPa), or otherwise for a variety of pneumatic, vacuum, shop air, general industrial, maintenance, and automotive applications such as for air, oil, antifreeze, and fuel.

As it is anticipated that certain changes may be made in the present invention without departing from the precepts herein involved, it is intended that all matter contained in the foregoing description shall be interpreted as illustrative and not in a limiting sense. All references including any priority documents cited herein are expressly incorporated by reference.

What is claimed is:

1. A compact hose having a tubular wall comprising:
   an innermost tube formed of a vulcanized rubber comprising an acrylonitrile butadiene rubber (NBR) or a copolymer or blend thereof, the innermost tube having a tube wall thickness (t) of between about 0.02-0.05 inch (0.5-1.25 mm);
   a first reinforcement layer surrounding the innermost tube and being bonded thereto;
   at least a second reinforcement layer surrounding the first interlayer;
   an interlayer interposed between the first and the second reinforcement layer, the interlayer bonding the first reinforcement layer to the second reinforcement layer; and
   a cover surrounding the second reinforcement layer,
   wherein the wall has a hose wall thickness (T), and the tube wall thickness t comprises less than about 25% of the hose wall thickness.

2. The hose of claim 1 wherein the rubber is filled with between about 15-66% by weight of a particulate filler selected from the group consisting of carbon blacks, clays, pulp fibers, and mixtures thereof.

3. The hose of claim 1 wherein the rubber has a modulus of at about 12 MPa and a tensile strength of at least about 18 MPa.

4. The hose of claim 1 wherein each of the first and the second reinforcement layers are spiral wound.

5. The hose of claim 4 wherein:
   the first reinforcement layer is spiral wound in a first winding direction; and
   the second reinforcement layer is spiral wound in a second winding direction opposite the first winding direction.

6. The hose of claim 5 wherein: the hose has a central longitudinal axis and
   the first reinforcement layer is laid at a positive angle relative to the longitudinal axis; and
   the second reinforcement layer is laid at a negative angle relative to the longitudinal axis.

7. The hose of claim 6 wherein:
   the angle of one of the first and the second reinforcement layer is between about 45° and 63°; and
   the angle of the other one of the first and the second reinforcement layer is between about −45° and −65°.

8. The hose of claim 1 wherein:
   the first reinforcement layer comprises one or more filaments of a first metal or metal alloy wire; and
   the second reinforcement layer lines comprise one or more filaments of a second metal or metal alloy wire fiber the same as or different than the first metal or metal alloy wire.

9. The hose of claim 1 wherein the hose has an inner diameter defined by the innermost tube.

10. The hose of claim 9 wherein:
   the inner diameter is between about 0.25-2 inch (6-51 mm).

11. The hose of claim 1 wherein the hose wall thickness $T_5$ is between about 0.12-0.5 inch (3-13 mm).

12. The hose of claim 1 wherein the hose is rated for a service pressure of 4000-8000 psi (28-55 MPa).

\* \* \* \* \*